United States Patent
Sandhage

(10) Patent No.: US 12,491,559 B2
(45) Date of Patent: Dec. 9, 2025

(54) METHODS FOR FABRICATING REFRACTORY COMPLEX CONCENTRATED ALLOYS AND COMPOSITES CONTAINING SUCH ALLOYS, AND BODIES CONTAINING THE SAME

(71) Applicant: Purdue Research Foundation, West Lafayette, IN (US)

(72) Inventor: Kenneth Henry Sandhage, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 118 days.

(21) Appl. No.: 18/455,373

(22) Filed: Aug. 24, 2023

(65) Prior Publication Data
US 2023/0405671 A1 Dec. 21, 2023

Related U.S. Application Data

(62) Division of application No. 17/208,424, filed on Mar. 22, 2021, now Pat. No. 11,745,259.

(60) Provisional application No. 62/994,434, filed on Mar. 25, 2020.

(51) Int. Cl.
| | |
|---|---|
| B32B 15/04 | (2006.01) |
| B22F 3/00 | (2021.01) |
| B22F 3/11 | (2006.01) |
| B22F 3/14 | (2006.01) |
| B22F 3/16 | (2006.01) |
| B22F 9/20 | (2006.01) |
| B22F 9/24 | (2006.01) |
| B22F 9/30 | (2006.01) |

(52) U.S. Cl.
CPC ............ *B22F 3/001* (2013.01); *B22F 3/1143* (2013.01); *B22F 3/14* (2013.01); *B22F 3/16* (2013.01); *B22F 9/20* (2013.01); *B22F 9/24* (2013.01); *B22F 9/30* (2013.01); *B32B 15/04* (2013.01); *B22F 2003/145* (2013.01); *B22F 2301/20* (2013.01)

(58) Field of Classification Search
None
See application file for complete search history.

(56) References Cited

U.S. PATENT DOCUMENTS

| | | | | |
|---|---|---|---|---|
| 2006/0248509 A1* | 11/2006 | Gunnmarker | ....... | G06F 11/2236 714/E11.166 |
| 2008/0163957 A1* | 7/2008 | Brady | ..................... | C22C 38/04 148/326 |
| 2020/0206390 A1* | 7/2020 | Roth | ....................... | A61L 29/02 |

FOREIGN PATENT DOCUMENTS

| | | | | |
|---|---|---|---|---|
| CN | 114807823 | * | 7/2022 | |
| JP | 2012007223 A | * | 1/2012 | |
| KR | 20230045694 A | * | 4/2023 | |

OTHER PUBLICATIONS

English translation of JP 2012007223 (originally published Jan. 12, 2012), obtained from PE2E search.*
English translation of CN 114807823 (originally published Jul. 29, 2022), obtained from PE2E search.*
English translation of KR 20230045694 (originally published Apr. 5, 2023), obtained from PE2E search.*
Matsuoka, Y. et al., "Effect of Grain Size on Thermal and Mechanical Stability of Austenite in Metastable Austenitic Stainless Steel", ISIJ International, vol. 53, No. 7, pp. 1224-1230, Year:2013.*

* cited by examiner

*Primary Examiner* — George Wyszomierski
(74) *Attorney, Agent, or Firm* — Hartman Global IP Law; Gary M. Hartman; Domenica N.S. Hartman

(57) ABSTRACT

Methods for producing final bodies that contain a fine-grained refractory complex concentrated alloy (RCCA), as well as RCCAs, intermediate materials and final bodies containing the RCCAs, and high-temperature devices formed by such final bodies. Such a method includes providing a precursor with one or more precursor compounds containing elements of an RCCA, reducing the precursor compounds in the precursor via reaction with a reducing agent so as to generate the RCCA and a compound comprising a product of the reaction between the reducing agent and the precursor compounds, generating a solid material that contains at least the RCCA, forming with the solid material a porous intermediate body, and consolidating the porous intermediate body so as to partially or completely remove the pore volume from the porous intermediate body, and in doing so yield either a denser final body or a denser film.

13 Claims, No Drawings

METHODS FOR FABRICATING REFRACTORY COMPLEX CONCENTRATED ALLOYS AND COMPOSITES CONTAINING SUCH ALLOYS, AND BODIES CONTAINING THE SAME

CROSS-REFERENCE TO RELATED APPLICATIONS

This is a division patent application of co-pending U.S. patent application Ser. No. 17/208,424 filed Mar. 22, 2021, which claims the benefit of U.S. Provisional Application No. 62/994,434 filed Mar. 25, 2020. The contents of these prior applications are incorporated herein by reference.

STATEMENT REGARDING GOVERNMENT FUNDING

This invention was made with government support under 1922316-DMR awarded by the National Science Foundation. The government has certain rights in the invention.

BACKGROUND

The present disclosure generally relates to methods to produce mechanically-robust, chemically-robust, high-temperature solid materials containing refractory complex concentrated alloys (RCCAs). The disclosure also relates to fabricating RCAA composites and high-temperature components, devices, and other bodies containing such RCCAs and RCCA composites.

This section introduces aspects that may help facilitate a better understanding of the disclosure. Accordingly, these statements are to be read in this light and are not to be understood as admissions about what is or is not prior art.

Refractory complex concentrated alloys (RCCAs) are a relatively recently identified class of metal alloys that have been categorized as comprising several of the following refractory metal elements at high concentrations: titanium (Ti), zirconium (Zr), hafnium (Hf), vanadium (V), niobium (Nb), tantalum (Ta), chromium (Cr), molybdenum (Mo), and tungsten (W). Other elements, such as aluminum (Al), chromium (Cr), and silicon (Si), are also often added to RCCAs to enhance the physical, mechanical, and chemical properties of these alloys (e.g., to improve their high-temperature strength, lower the density, and/or increase the high-temperature oxidation resistance).

RCCAs have high melting points (for example, about 1600° C. and above), and a key motivation for developing RCCAs is to achieve high-temperature mechanical and chemical properties that are not possible with current state-of-the-art structural metal alloys, such as nickel-based (Ni-based) superalloys, for use in high-temperature applications. While certain RCCAs have already exhibited high-temperature mechanical properties that exceed those of Ni-based superalloys, such RCCAs do not simultaneously possess high-temperature oxidation resistance equal to or better then Ni-based superalloys at temperatures of 1000° C. or higher in oxidizing gases, such as air.

The addition of particular elements, including Al, Cr, Si, or combinations of these elements, to RCCAs has been examined for enhancing the high-temperature oxidation resistance of such alloys. The reason for such elemental additions is to enable the formation of an external, continuous, slow-growing oxide scale on the surface of an RCCA upon exposure to an oxidizing gas at high temperatures so as to improve the oxidation resistance of the RCCA.

While continuous external chromium oxide ($Cr_2O_3$) scales are effective at temperatures less than about 1000° C. for providing such oxidation resistance, continuous external $Cr_2O_3$ scales are less effective at higher temperatures, owing to a relatively high rate of volatilization of $Cr_2O_3$ scales in high-oxygen-bearing atmospheres above about 1000° C.

In the presence of water vapor, silicon dioxide ($SiO_2$) scales can form volatile Si—O—H species above about 1000° C., so that external $SiO_2$ scales become less protective in humid environments at such temperatures.

External, slow-growing aluminum oxide ($Al_2O_3$) scales are preferred over external $Cr_2O_3$ or $SiO_2$ scales above about 1000° C. in oxidizing environments and in oxidizing humid environments, respectively. Unfortunately, additions of Al to bulk, coarse-grained RCCAs at concentrations required to allow for the formation of a continuous, external, slow-growing $Al_2O_3$ scale in oxidizing environments above about 1000° C. tends to result in the reaction of the Al with the refractory elements to yield brittle Al-bearing intermetallic compounds which, in turn, degrade the mechanical properties of the RCCA.

Due to the factors mentioned above, there is a strong desire to develop RCCAs and RCCA composites capable of developing an external, continuous, slow-growing oxide scale on their surfaces that will provide oxidation resistance when exposed to an oxidizing gas at high temperatures, for example, at temperatures above 1000° C., while at the same time minimizing the formation of brittle intermetallic compounds.

BRIEF SUMMARY OF THE INVENTION

The present invention provides methods for producing final bodies that contain a fine-grained refractory complex concentrated alloy, as well as the fine-grained refractory complex concentrated alloy, intermediate materials and final bodies containing the fine-grained refractory complex concentrated alloy, and high-temperature devices formed by such final bodies.

An alloy is defined herein as one or more of a single phase and a mixture of at least two phases where each phase is comprised of one or more elements. A phase is defined herein as a homogeneous volume of matter.

A refractory complex concentrated alloy (RCCA) is defined herein as an alloy comprising one or more of the following refractory metal elements at high concentrations: titanium (Ti), zirconium (Zr), hafnium (Hf), vanadium (V), niobium (Nb), tantalum (Ta), chromium (Cr), molybdenum (Mo), and tungsten (W).

According to one aspect of the invention, a method for producing a final body includes providing a precursor comprising one or more precursor compounds containing elements of the fine-grained refractory complex concentrated alloy, reducing the one or more precursor compounds in the precursor via reaction with a reducing agent so as to generate the fine-grained refractory complex concentrated alloy and a compound comprising a product of the reaction between the reducing agent and the one or more precursor compounds, generating a solid material that contains at least the fine-grained refractory complex concentrated alloy, forming with the solid material a porous intermediate body comprising a pore volume, and consolidating the porous intermediate body so as to partially or completely remove the pore volume from the porous intermediate body, and in doing so yield either the final body having a lower porosity than the porous intermediate body or a film that is on a surface of the final body and has a lower porosity than the porous intermediate body.

Technical aspects of methods as described above preferably include the ability to produce final bodies of fine-grained refractory complex concentrated alloys (RCCAs) and fine-grained RCCA composites that are capable of developing an external, continuous, slow-growing oxide scale on their surfaces that will provide oxidation resistance when exposed to an oxidizing gas at high temperatures, for example, at temperatures above 1000° C. A particular but nonlimiting example is the ability to produce RCCAs and RCCA composites that have reduced Al contents to minimize the formation of brittle intermetallic compounds, yet achieve the formation of a continuous, external, slow-growing $Al_2O_3$ scale for oxidation resistance.

Other aspects and advantages of this invention will be appreciated from the following detailed description.

DETAILED DESCRIPTION

For the purposes of promoting an understanding of the principles of the disclosure, reference will now be made to particular embodiments. It will nevertheless be understood that no limitation of the scope of the disclosure is thereby intended, and that alterations and modifications to the embodiments and further applications of the principles of the disclosure as described herein are contemplated as would normally occur to one skilled in the art to which the disclosure relates.

The present disclosure relates to solid materials that are preferably both mechanically robust and chemically robust at high temperatures, for example, about 600° C. and above and in some cases about 1000° C. and above, and in yet other cases about 1400° C. and above, and to methods for producing such solid materials. For example, the present disclosure relates to solid materials and methods of producing solid materials that are sufficiently mechanically robust and chemically robust at high temperatures so as to be capable of exhibiting mechanical and/or chemical properties that equal or exceed those of nickel-based superalloys at temperatures at or above 600° C. The present disclosure further relates to solid materials and methods of producing solid materials whose oxidation resistance is equal to or exceed those of nickel-based superalloys at temperatures at or above 600° C. and in some cases at or above 1000° C. and in yet other cases at or above 1400° C. This disclosure encompasses solid materials that comprise refractory complex concentrated alloys (RCCAs), for example, solid materials that consist entirely of one or more RCCAs or may be a mixture of one or more RCCAs and one or more compounds to yield a composite, referred to herein sometimes as an "RCCA composite," for example, a mixture of one or more RCCAs and one or more ceramic compounds to yield a ceramic composite, referred to herein sometimes as an "RCCA/ceramic composite."

The RCCAs contain at least one or more of the following refractory elements at high concentrations, for example at or above 5 at %: titanium (Ti), zirconium (Zr), hafnium (Hf), vanadium (V), niobium (Nb), tantalum (Ta), chromium (Cr), molybdenum (Mo), and tungsten (W), preferably with additions of one or more of aluminum (Al), chromium (Cr), and silicon (Si) to enhance physical, mechanical, and/or chemical properties of the RCCAs, as nonlimiting examples, greater high-temperature strength, lower densities, and/or greater high-temperature oxidation resistance.

Such solid materials may be produced or processed by suitable methods to be in the form of final bodies that are capable of exhibiting the aforementioned mechanical and chemical robustness at high temperatures, or be used in the manufacture of final bodies, for example, to form films or coatings that are on surfaces of final bodies and are capable of exhibiting the aforementioned mechanical and chemical robustness at high temperatures. Such final bodies may be, as nonlimiting examples, components and devices, which may include but are not limited to high temperature devices for defense applications (including for hypersonic missiles, jet aircraft, tanks or other land-based military vehicles, surface naval ships, and submarines), for energy production (including for electrical power production, such as for fossil-fuel-derived electricity, solar-energy-derived electricity, geothermal-derived electricity, and nuclear-derived electricity), and for transportation (including for aircraft, rockets, automobiles, trucks, buses, and trains), and components that include, but are not limited to, high-temperature engine components (including turbine blades), high-temperature heat exchangers, high-temperature pump components (including impellers), high-temperature rocket nozzles, high-temperature welding tools (including high-temperature friction stir welding tools), and high-temperature leading edges of hypersonic missiles.

Another particular but nonlimiting aspect of the invention is the ability to provide or produce any of the solid materials described above (as well as final bodies and films produced therefrom) to contain one or more RCCAs having fine grain sizes (and optionally compounds having fine grain sizes) for enhanced mechanical and/or chemical properties that equal or exceed those of coarser-grained RCCAs over a given range of temperatures. Such enhanced mechanical properties may include, but are not limited to, one or more of higher elastic modulus, higher yield strength, higher ultimate tensile strength, higher ductility, higher toughness, higher creep resistance, higher creep rupture life, higher fatigue strength, enhanced stiffness, and reduced ductile-to-brittle transition temperature. Such enhanced chemical properties may include, but are not limited to, greater resistance to reaction with a reactive fluid (a reactive gas, reactive liquid, reactive supercritical fluid, or reactive plasma), as nonlimiting examples, an oxygen-bearing fluid, a nitrogen-bearing fluid, a sulfur-bearing fluid, a carbon-bearing fluid, a chlorine-bearing fluid, and a fluorine-bearing fluid. Temperature ranges of particular interest include, but are not limited to, from room temperature (about 25° C.) up to about 1000° C., or up to about 1200° C., or up to about 1400° C., or up to about 2000° C., and in some cases exceeding 2000° C.

Other particular but nonlimiting aspects of such solid materials and their methods of production include the fine-grained RCCAs preferably having an average grain size of, as nonlimiting examples, less than or equal to 20 micrometers, for example, less than or equal to 5 micrometers or less than or equal to 1 micrometer and in some cases 100 nanometers or less. If present, the optional fine-grained compounds (as examples, ceramic compounds) also preferably have an average grain size of less than or equal to 20 micrometers, for example, less than or equal to 5 micrometers or less than or equal to 1 micrometer and in some cases 100 nanometers or less.

Any of the solid materials described above (as well as final bodies and films produced therefrom) may be produced or processed by suitable methods to have a high concentration of RCCA grain boundaries, or in the case of RCCA composites optionally a high concentration of RCCA grain boundaries and a high concentration of interphase (compound/metal) boundaries. As a nonlimiting example, a high concentration of grain boundaries in a solid material that contains an Al addition (hereinafter, an Al-bearing RCCA or Al-bearing RCCA composite) promotes the ability of the grain boundaries to act as rapid diffusion pathways for an enhanced rate of outward migration of the Al in the bulk RCCA to the external surface of the final body or film formed by the RCCA, and in so doing allows for the formation of a continuous, slow-growing external $Al_2O_3$ scale, even with a modest overall addition of Al in the bulk RCCA, as nonlimiting examples, about 5 at % Al or less or in some cases about 10 at % Al or less, and yet in other cases about 20 at % Al or less. Because of this enhanced rate of outward migration of Al, the overall amount of Al needed in the bulk RCCA or RCCA composite to form a continuous slow-growing external $Al_2O_3$ scale is reduced relative to a coarser-grained RCCA having the same overall composition, thereby minimizing the formation of brittle Al-bearing intermetallic compounds that may degrade the mechanical properties of an RCCA.

A particular but nonlimiting aspect of the invention is the ability of any of the solid materials described above (as well as final bodies and films produced therefrom) to exhibit a reduced mass gain per area or a reduced rate of recession with exposure time to a reactive fluid at an elevated temperature. As a nonlimiting example, a solid material may contain a modest Al addition and still allow for the formation of a continuous, external, slow-growing $Al_2O_3$ scale during exposure to oxidizing environments at elevated temperatures. Such an attribute is beneficial to enable Al-bearing RCCA and RCCA composites to exhibit relative low mass gain per area, in some instances, less than 1 mg/cm² after exposure for 100 h to air at 1 atm and at temperatures of 1200° C. or more, or in some cases at temperatures of 1400° C. or more, and yet in other cases at temperatures of 1600° C. or more.

Furthermore, in an RCCA composite, the one or more compounds may serve to pin grain boundaries in the RCCA to inhibit grain growth of the RCCA phase at elevated temperatures. As a nonlimiting example, in an oxide/Al-bearing RCCA/ceramic composite, the oxide phase can pin the grain boundaries in the Al-bearing RCCA phase so that grain growth of the Al-bearing RCCA phase is inhibited at high temperatures. Such inhibition of grain growth allows a fine-grained oxide/Al-bearing RCCA composite to retain a high concentration of grain boundaries and interphase boundaries for prolonged times at elevated temperatures, so that the formation of a continuous, slow-growing external $Al_2O_3$ scale can be maintained over prolonged times at elevated temperatures.

Other particular but nonlimiting aspects of the invention include the ability to produce any of the solid materials described above (as well as final bodies and films produced therefrom) via a low-temperature reduction of a precursor comprising one or more precursor compounds that contain one or more of the refractory metal elements of the RCCA. Such precursor compounds include, but are not limited to, oxides, nitrides, sulfides, chlorides, fluorides, and mixtures thereof. The low-temperature reduction of such precursor compounds is conducted with the use of a reducing agent, which may be contained within a solid phase or within a fluid phase (wherein the fluid phase may be a gas, a liquid, a supercritical fluid, or a plasma). Such a reducing agent may be, but is not limited to, alkaline earth and alkali elements (such as magnesium, calcium, strontium, barium, lithium, sodium, and/or potassium). Reduction herein refers to the chemical conversion of the precursor compounds into an RCCA and the desired elements thereof and, if an RCCA composite, the desired compounds thereof.

Prior to reduction to yield any of the RCCAs or RCCA composites described above, the precursor containing the precursor compounds may be produced in the form of a precursor powder or a precursor film. Precursor powders may be formed by a variety of methods including, but not limited to, the Pechini method, precipitation processing, hydrothermal processing, polymer pyrolysis, sol-gel processing, freeze drying, combustion synthesis, mechanochemical synthesis, molten salt synthesis, or other chemical or physical processes. Precursor films may be produced by a variety of methods including, but not limited to, chemical deposition processes and physical deposition processes. Such chemical deposition processes include, but are not limited to, liquid-based deposition processes, gas-based deposition processes, and plasma-based deposition processes. Such liquid-based deposition processes include, but are not limited to, sol-gel-based deposition, protein-based deposition, hydrothermal-based deposition, molten-salt-based deposition, and electrophoretic deposition. Such liquid-based deposition processes may be conducted by methods including, but not limited to, dip coating, tape casting, spin coating, slip casting, screen printing, aerosol spray deposition, ink jet printing, direct writing, and gel casting. Such gas-based deposition processes include, but are not limited to, chemical vapor deposition-based processes and physical vapor deposition-based processes. Such chemical vapor deposition-based processes include, but are not limited to, metalorganic chemical vapor deposition. Such physical vapor deposition-based processes include, but are not limited to, magnetron sputtering, pulsed laser deposition, thermal evaporation, arc evaporation, and electron gun-aided evaporation.

The precursor compounds of the present disclosure, in the form of powders or films or porous bodies, undergo the aforementioned low-temperature reduction process to yield solid materials that contain fine-grained RCCAs or fine-grained RCCA composites, which may also be in the form of powders or films or porous bodies. Nonlimiting examples of compounds that may be produced as one or more products of the reaction between the precursor compounds and the reducing agent include, but are not limited to, magnesium oxide (MgO), calcium oxide (CaO), strontium oxide (SrO), barium oxide (BaO), lithium oxide ($Li_2O$), sodium oxide ($Na_2O$), and potassium oxide ($K_2O$).

One nonlimiting example of a low-temperature reducing agent is magnesium vapor. Consider, for example, the reactions shown in Table 1 involving Mg vapor at 900 K (627° C.).

TABLE 1

Thermodynamic analyses of reactions involving Mg vapor. $\Delta G°_{rxn}(627° C.)$ is the standard Gibbs free energy change of reaction per mole of Mg(g) involved in the reaction at 627° C. $p_{Mg}^E$ is the magnesium vapor pressure associated with each reaction at equilibrium at 627° C.

| Reaction | | $\Delta G°_{rxn}$[627° C.] | $p_{Mg}^E$[627° C.] |
|---|---|---|---|
| Mg(s) = Mg(g) | [1] | +44.4 kJ/mole | $2.64 \times 10^{-3}$ atm |
| Mg(g) + TiO(s) = MgO(s) + Ti(s) | [2] | −127.2 kJ/mole | $4.17 \times 10^{-8}$ atm |
| Mg(g) + ½ZrO$_2$(s) = MgO(s) + ½Zr(s) | [3] | −119.5 kJ/mole | $1.15 \times 10^{-7}$ atm |
| Mg(g) + NbO(s) = MgO(s) + Nb(s) | [4] | −245.2 kJ/mole | $5.86 \times 10^{-15}$ atm |
| Mg(g) + ⅕Ta$_2$O$_5$(s) = MgO(s) + ⅖Ta(s) | [5] | −253.2 kJ/mole | $2.02 \times 10^{-15}$ atm |
| Mg(g) + ½WO$_2$(s) = MgO(s) + ½W(s) | [6] | −370.3 kJ/mole | $3.22 \times 10^{-22}$ atm |
| Mg(g) + ½MoO$_2$(s) = MgO(s) + ½Mo(s) | [7] | −370.8 kJ/mole | $3.02 \times 10^{-22}$ atm |
| Mg(g) + ⅓Al$_2$O$_3$(s) = MgO(s) + ⅔Al(l) | [8] | −118.1 kJ/mole | $1.40 \times 10^{-7}$ atm |
| Mg(g) + ⅓Cr$_2$O$_3$(s) = MgO(s) + ⅔Cr(s) | [9] | −282.2 kJ/mole | $4.19 \times 10^{-17}$ atm |
| Mg(g) + ½SiO$_2$(s) = MgO(s) + ½Si(s) | [10] | −217.6 kJ/mole | $2.36 \times 10^{-13}$ atm |

The equilibrium vapor pressure of Mg(g) generated over the pure solid Mg (reaction [1]) at 627° C. ($p_{Mg}^E$[627° C.]) is $2.64 \times 10^{-3}$ atm. This vapor pressure is far higher than the values of the equilibrium Mg vapor pressure associated with reactions [2] through [10] at 627° C.; that is, the values of the Mg vapor pressure required for reactions [2] through [10] to proceed spontaneously to the right at 627° C. are less than $1.15 \times 10^{-7}$ atm, which are more than 20,000 times lower than the equilibrium Mg vapor pressure generated by reaction [1] at 627° C. Consequently, the partial pressure of Mg(g) generated by heating Mg(s) to 627° C. in the vicinity of TiO(s), ZrO$_2$(s), NbO(s), Ta$_2$O$_5$(s), WO$_2$(s), MoO$_2$(s), Al$_2$O$_3$(s), Cr$_2$O$_3$(s), and SiO$_2$(s) is far more than sufficient to allow for the reduction of these oxides into elemental Ti(s), Zr(s), Nb(s), Ta(s), W(s), Mo(s), Al(l), Cr(s), and Si(s), respectively (as indicated by reactions [2]-[10] in Table 1). It is also worth noting that Mg vapor does not undergo further reactions with Ti, Zr, Nb, Ta, W, Mo, or Cr to form any stable intermetallic compounds.

Hence, precursor compounds of the present disclosure, in the form of powders and films and porous bodies, may undergo a low-temperature reduction process using Mg vapor as a reducing agent to yield fine-grained MgO/Al-bearing RCCA composites (via reactions [2]-[10] in Table 1) in the form of solid powders and films and porous bodies that contain an RCCA as well as MgO as a ceramic compound.

Optionally, the MgO products of reactions [2]-[10] may be selectively removed to yield a solid powder or film or porous body that only contains fine-grained Al-bearing RCCAs. Such selective removal may be conducted by a method including, but not limited to, selective dissolution in a fluid, selective reaction with a fluid, and selective segregation in a fluid (wherein such fluids may be a gas, a liquid, a supercritical fluid, or a plasma). As a nonlimiting example, selective dissolution of the MgO may be performed in an acid, a base, or a molten salt.

For the case where the reduction process is conducted on a precursor powder to yield a solid material in the form of a fine-grained RCCA powder or a fine-grained RCCA composite powder, the solid material can be further formed to generate an intermediate body that may be porous, and therefore may benefit from being consolidated to partially or completely remove a pore volume within the porous intermediate body and yield part or all of a final body, for example, a dense, fine-grained Al-bearing RCCA body or a dense, fine-grained oxide/Al-bearing RCCA composite body. Such forming may be conducted by methods including, but not limited to, pressing within a shaped die, extrusion through a shaped die, powder injection molding into a shaped die, tape casting, slip casting, 3-D printing, screen printing, and direct writing. Such consolidation may be conducted by a method including, but not limited to, sintering, hot pressing, spark plasma sintering, or hot isostatic pressing.

For the case where the reduction process is conducted on a precursor film to yield a solid material in the form of a fine-grained RCCA film or a fine-grained RCCA composite film, the solid material can be in the form of a porous intermediate film on a body and therefore may benefit from being consolidated to partially or completely remove a pore volume within the porous intermediate film and yield part or all of a dense fine-grained RCCA film or a dense fine-grained RCCA composite film on the body.

As a nonlimiting example, a fine-grained Ta—Nb—Mo—W—Cr equimolar alloy (i.e., with a Ta:Nb:Mo:W:Cr atomic ratio of 1:1:1:1:1) doped with a smaller amount of Al (e.g., 5 at %) is fabricated via the magnesiothermic reduction of a fine-grained Ta$_2$O$_5$—Nb$_2$O$_5$—MoO$_2$—WO$_2$—Cr$_2$O$_3$—Al$_2$O$_3$ mixture possessing a Ta$_2$O$_5$:Nb$_2$O$_5$:MoO$_2$:WO$_2$:Cr$_2$O$_3$:Al$_2$O$_3$ molar ratio of 0.5:0.5:1:1:0.5:0.132. This fine-grained Ta$_2$O$_5$—Nb$_2$O$_5$—MoO$_2$—WO$_2$—Cr$_2$O$_3$—Al$_2$O$_3$ mixture is prepared via the Pechini method from Ta—Nb—Mo—W—Cr—Al-bearing precursors introduced into a liquid solution also containing one or more chelating agents (such as arginine and citric acid) and one or more polymerizing agents (such as ethylene glycol). The solvent is allowed to evaporate upon heating of the liquid solution (e.g., to less than about 100° C.), with the solution then becoming quite viscous (due to polymerization of the one or more polymerizing agents). The viscous mass is then heated in air at a modest temperature (e.g., less than about 800° C.) for a sufficient time as to allow for pyrolysis of organic constituents, so as to yield a fine-grained multicomponent oxide powder. The fine-grained multicomponent oxide (Ta—Nb—Mo—W—Cr—Al—O-bearing) powder is then exposed to magnesium vapor at a modest temperature (e.g., less than about 800° C.) for a sufficient time as to allow for reduction of the fine-grained multicomponent oxide powder to yield fine-grained MgO/Ta—Nb—Mo—W—Cr—Al powder (as per reactions of the type shown in Table 1). The MgO in the fine-grained MgO/Ta—Nb—Mo—W—Cr—Al powder is then selectively removed by dissolution in a dilute acid to yield fine-grained Ta—Nb—Mo—W—Cr—Al powder. The fine-grained Ta—Nb—Mo—W—Cr—Al powder is then formed into a desired shape by cold-compaction in a shaped die, and then consolidated into a dense fine-grained RCCA body by hot isostatic pressing at a modest temperature.

As another nonlimiting example, a fine-grained Ta—Nb—Mo—W—Cr equimolar alloy (i.e., with a Ta:Nb:Mo:W:Cr atomic ratio of 1:1:1:1:1) doped with a smaller amount of Al (e.g., 5 at %) is fabricated via the magnesiothermic reduction of a fine-grained $Ta_2O_5$—$Nb_2O_5$—$MoO_2$—$WO_2$—$Cr_2O_3$—$Al_2O_3$ mixture possessing a $Ta_2O_5$:$Nb_2O_5$:$MoO_2$:$WO_2$:$Cr_2O_3$:$Al_2O_3$ molar ratio of 0.5:0.5:1:1:0.5:0.132. This fine-grained $Ta_2O_5$—$Nb_2O_5$—$MoO_2$—$WO_2$—$Cr_2O_3$—$Al_2O_3$ mixture is prepared via the Pechini method from Ta—Nb—Mo—W—Cr—Al-bearing precursors introduced into a liquid solution also containing one or more chelating agents (such as arginine and citric acid) and one or more polymerizing agents (such as ethylene glycol). The solvent is allowed to evaporate upon heating of the liquid solution (e.g., to less than about 100° C.), with the solution then becoming quite viscous (due to polymerization of the one or more polymerizing agents). The viscous mass is then heated in air at a modest temperature (e.g., less than about 800° C.) for a sufficient time as to allow for pyrolysis of organic constituents, so as to yield a fine-grained multicomponent oxide powder. The fine-grained multicomponent oxide (Ta—Nb—Mo—W—Cr—Al—O-bearing) powder is then exposed to magnesium vapor at a modest temperature (e.g., less than about 800° C.) for a sufficient time as to allow for reduction of the fine-grained multicomponent oxide powder to yield fine-grained MgO/Ta—Nb—Mo—W—Cr—Al powder (as per reactions of the type shown in Table 1). The fine-grained MgO/Ta—Nb—Mo—W—Cr—Al powder is then formed into a desired shape by cold-compaction in a shaped die, and then consolidated into a dense, fine-grained MgO/Ta—Nb—Mo—W—Cr—Al composite body by hot isostatic pressing at a modest temperature.

Another nonlimiting example is to utilize chemical synthesis to produce a precursor comprising precursor compounds that contain refractory metal elements of the desired RCCA. Such a process may entail preparing a liquid precursor solution containing the precursor compounds and polymerization of the liquid precursor solution to yield a polymerized precursor, from which a fine-grained powder can be synthesized by pyrolysis of the polymerized precursor. The resulting fine-grained powder can then undergo complete or partial reduction, forming, and consolidation to generate a dense, fine-grained RCCA or RCCA composite, for example, as previously described.

With such a process, a fine-grained equiatomic W—Mo—Cr alloy ($W_{0.34}Mo_{0.33}Cr_{0.33}$) can be fabricated. W, Mo, and Cr exhibit low oxygen solubilities at elevated temperatures relative to other refractory metals (e.g., Ti, Zr, Hf, Nb, and Ta). The Cr present in the W—Mo—Cr alloy allows for the formation of a protective, slow-growing $Cr_2O_3$ external scale in air or oxygen-rich environments, at least at temperatures up to about 1000° C. (i.e., in the absence of appreciable $Cr_2O_3$ volatilization). Thermodynamic calculations indicate that a $W_{0.34}Mo_{0.33}Cr_{0.33}$ composition can exist as a single BCC solid solution phase over a wide temperature range (from about 1145° C. to a melting point of about 2237° C.). Below 1145° C., this composition can separate into two BCC solid solutions: a Cr-rich, Cr—Mo—W phase and a Cr-depleted, Cr—Mo—W phase (e.g., at 1000° C., a mixture of a $Cr_{0.81}Mo_{0.12}W_{0.07}$ BCC phase and a $Cr_{0.19}Mo_{0.40}W_{0.41}$ BCC phase can form).

To produce a fine-grained W—Mo—Cr alloy, a fine-grained, intimate $WO_3$—$MoO_3$—$Cr_2O_3$-bearing powder mixture was generated. Ammonium metatungstate hydrate ($[NH_4]_6W_{12}O_{39}·xH_2O$), ammonium dimolybdate ($[NH_4]2Mo_2O_7$), and chromium (III) acetate hydroxide ($Cr_3[OH]_2[OOCCH_3]_7$) were used as water-soluble, W-bearing, Mo-bearing, and Cr-bearing precursors, respectively. These salt precursors were added to a solution containing arginine and citric acid (chelating agents) to generate an aqueous solution with an equimolar metal ratio (i.e., with an atomic W:Mo:Cr ratio=1:1:1). The solution was stirred for about one hour at about 50° C. Ethylene glycol was then added, to generate a solution with an ethylene glycol:W:Mo:Cr molar ratio of 10:1:1:1, and the solution was stirred for about two hours at about 80° C. The solution was then heated to about 95° C. with continuous stirring for about one hour for water evaporation and to generate a viscous gel. The gel was placed in magnesium oxide (MgO) crucibles and heated in flowing air (360 $cm^3$/min) to about 700° C. for about six hours to allow for organic pyrolysis and to form a fine $WO_3$—$MoO_3$—$Cr_2O_3$-bearing powder mixture.

A low-temperature reduction process was then used to convert the fine $WO_3$—$MoO_3$—$Cr_2O_3$-bearing powder mixture into a fine-grained, W—Mo—Cr-bearing RCCA powder mixture. The $WO_3$—$MoO_3$—$Cr_2O_3$-bearing powder mixture was placed in an MgO crucible and positioned inside a steel tube. Another MgO crucible containing magnesium (Mg) powder was then placed inside the steel tube, alongside the $WO_3$—$MoO_3$—$Cr_2O_3$-bearing MgO crucible. The ends of the steel tube were then crimped and welded shut inside an Ar atmosphere glovebox. The steel tube was placed inside a flowing Ar atmosphere tube furnace, which was then heated to 700° C. and held at this temperature for about six hours. This thermal treatment was conducted to allow for the generation of Mg vapor inside the tube and reaction of this vapor with the $WO_3$—$MoO_3$—$Cr_2O_3$-bearing powder to yield a W—Mo—Cr—MgO-bearing mixture (a mixture of a metallic W—Mo—Cr alloy and MgO). After removal from the steel tube, the W—Mo—Cr—MgO powder mixture was immersed in 3 M acetic acid with stirring for about four hours at room temperature, in order to selectively dissolve the MgO phase. The resulting fine W—Mo—Cr powder was removed from the acetic acid solution via centrifugation at 9000 rpm for about six minutes. The powder was then immersed in de-ionized water for about five minutes with ultrasonication, followed by separation from the water via centrifugation (9000 rpm, about six minutes). The latter water treatment was repeated four times (for a total of five exposures to water). X-ray diffraction (XRD) analysis of the resulting fine W—Mo—Cr powder mixture yielded peaks consistent with a predominant Mo—W-rich phase and a Cr-rich phase. Williamson-Hall analysis of the relatively intense diffraction peaks for the W—Mo-rich phase yielded an average crystal size of only 23+19 nm.

The fine W—Mo—Cr metal alloy powder mixture was then densified by uniaxial hot pressing. The W—Mo—Cr metal alloy powder was placed inside a boron-nitride-coated graphite die. Hot pressing of the powder was conducted at 1500° C. for about 2.5 hours with an applied pressure of 20 MPa to yield a densified W—Mo—Cr alloy disk. A cross-section of the disk was polished to achieve a final surface finish of 0.05 µm, to allow for microstructural analyses. Backscattered electron (BSE) images and elemental maps (from energy-dispersive X-ray analysis) revealed that the hot-pressed alloy consisted of a compact mixture of fine phases, with the phase sizes on the order of only about 2 micrometers. This alloy was comprised of a Cr-rich phase and two Cr-depleted phases, with one of the latter phases more enriched in W than the other phase. Vicker's microhardness indentation indicated relatively high hardness values of 876±25 HV0.5 for the multiphase W—Mo—Cr alloy.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting.

The invention claimed is:

1. A final body comprising:
a film formed of an aluminum-bearing fine-grained refractory complex concentrated alloy having an average grain size of 20 micrometers or less, wherein the aluminum-bearing fine-grained refractory complex concentrated alloy is a composite refractory complex concentrated alloy, and wherein the aluminum-bearing fine-grained refractory complex concentrated alloy comprises about 20 atomic % aluminum or less;
diffusion pathways formed along grain boundaries of the film to an external surface of the film, the diffusion pathways being operable to enhance outward migration of the aluminum in the aluminum-bearing fine-grained refractory complex concentrated alloy to the external surface of the film; and
a continuous external aluminum oxide scale on the external surface of the film and formed by the outward migration of the aluminum in the aluminum-bearing fine-grained refractory complex concentrated alloy.

2. The final body of claim 1, wherein the film does not contain a compound comprising a product of a reaction between a reducing agent and one or more precursor compounds from which the aluminum-bearing fine-grained refractory complex concentrated alloy is reduced.

3. The final body of claim 2, wherein the final body is a high-temperature device that operates at temperatures above about 600° C.

4. The final body of claim 3, wherein the high-temperature device is selected from the group consisting of a high-temperature device for a hypersonic missile, a high-temperature device for a supersonic missile, a high-temperature device for a subsonic missile, a high-temperature device for a hypersonic aircraft, a high-temperature device for a supersonic aircraft, a high-temperature device for a subsonic aircraft, a high-temperature device for a jet engine for aircraft, a high-temperature device for land-based vehicles, a high-temperature device for tanks and other land-based military vehicles, a high-temperature device for surface ships, a high-temperature device for surface military ships and submarines, a high-temperature device for energy production, a high-temperature device used for transportation, a high-temperature device used for manufacturing, a leading edge for a hypersonic missile, a leading edge for a supersonic missile, a leading edge for a hypersonic aircraft, a leading edge for a supersonic aircraft, a leading edge for a hypersonic spacecraft, a leading edge for a supersonic spacecraft, a rocket nozzle, a turbine blade, a piston, a pump impeller, a heat exchanger, a machining tool, and a friction stir welding tool.

5. The final body of claim 1, wherein the composite refractory complex concentrated alloy comprises the aluminum-bearing fine-grained refractory complex concentrated alloy and a compound comprising a product of a reaction between a reducing agent and one or more precursor compounds from which the aluminum-bearing fine-grained refractory complex concentrated alloy film is reduced.

6. The final body of claim 1, wherein the final body is a high-temperature device that operates at temperatures above about 600° C.

7. The final body of claim 6, wherein the high-temperature device is selected from the group consisting of a high-temperature device for a hypersonic missile, a high-temperature device for a supersonic missile, a high-temperature device for a subsonic missile, a high-temperature device for a hypersonic aircraft, a high-temperature device for a supersonic aircraft, a high-temperature device for a subsonic aircraft, a high-temperature device for a jet engine for aircraft, a high-temperature device for land-based vehicles, a high-temperature device for tanks and other land-based military vehicles, a high-temperature device for surface ships, a high-temperature device for surface military ships and submarines, a high-temperature device for energy production, a high-temperature device used for transportation, a high-temperature device used for manufacturing, a leading edge for a hypersonic missile, a leading edge for a supersonic missile, a leading edge for a hypersonic aircraft, a leading edge for a supersonic aircraft, a leading edge for a hypersonic spacecraft, a leading edge for a supersonic spacecraft, a rocket nozzle, a turbine blade, a piston, a pump impeller, a heat exchanger, a machining tool, and a friction stir welding tool.

8. The final body of claim 1, wherein the aluminum-bearing fine-grained refractory complex concentrated alloy film exhibits less than 1 mg/cm$^2$ mass gain per area after exposure for 100 hours to air at 1 atmosphere and temperatures of at least 1200° C.

9. The final body of claim 1, wherein the aluminum-bearing fine-grained refractory complex concentrated alloy contains aluminum in an amount of 10 atomic % or less.

10. The final body of claim 1, wherein the aluminum-bearing fine-grained refractory complex concentrated alloy contains aluminum in an amount of 5 atomic % or less.

11. An aluminum-bearing fine-grained refractory complex concentrated alloy comprising:
an average grain size of 20 micrometers or less and containing aluminum in an amount of 20 atomic % or less;
diffusion pathways formed along grain boundaries of the aluminum-bearing fine-grained refractory complex concentrated alloy to an external surface of the aluminum-bearing fine-grained refractory complex concentrated alloy, the diffusion pathways being operable to enhance outward migration of the aluminum in the aluminum-bearing fine-grained refractory complex concentrated alloy to the external surface of the aluminum-bearing fine-grained refractory complex concentrated alloy; and
a continuous external aluminum oxide scale on the external surface of the aluminum-bearing fine-grained refractory complex concentrated alloy and formed by the outward migration of the aluminum in the aluminum-bearing fine-grained refractory complex concentrated alloy;
wherein the aluminum-bearing fine-grained refractory complex concentrated alloy is a composite refractory complex concentrated alloy, and wherein the aluminum-bearing fine-grained refractory complex concentrated alloy does not contain a compound comprising a product of a reaction between a reducing agent and one or more precursor compounds from which the aluminum-bearing fine-grained refractory complex concentrated alloy film is reduced.

12. The aluminum-bearing fine-grained refractory complex concentrated alloy of claim 11, wherein the aluminum-bearing fine-grained refractory complex concentrated alloy contains aluminum in an amount of 10 atomic % or less.

13. The aluminum-bearing fine-grained refractory complex concentrated alloy of claim 11, wherein the aluminum-bearing fine-grained refractory complex concentrated alloy contains aluminum in an amount of 5 atomic % or less.

\* \* \* \* \*